(12) United States Patent
Zhao et al.

(10) Patent No.: US 10,864,626 B2
(45) Date of Patent: Dec. 15, 2020

(54) PARALLEL MECHANISM WITH SIX DEGREES OF FREEDOM HAVING ARC-SHAPED PRISMATIC PAIRS IN THREE BRANCHES

(71) Applicant: SHENZHEN INSTITUTES OF ADVANCED TECHNOLOGY CHINESE ACADEMY OF SCIENCES, Shenzhen (CN)

(72) Inventors: Guoru Zhao, Shenzhen (CN); Yongfeng Wang, Shenzhen (CN)

(73) Assignee: SHENZHEN INSTITUTES OF ADVANCED TECHNOLOGY CHINESE ACADEMY OF SCIENCES, Shenzhen (CN)

( * ) Notice: Subject to any disclaimer, the term of this patent is extended or adjusted under 35 U.S.C. 154(b) by 0 days.

(21) Appl. No.: 16/472,200

(22) PCT Filed: Mar. 29, 2017

(86) PCT No.: PCT/CN2017/078533
§ 371 (c)(1),
(2) Date: Jun. 21, 2019

(87) PCT Pub. No.: WO2018/176251
PCT Pub. Date: Oct. 4, 2018

(65) Prior Publication Data
US 2020/0189093 A1 Jun. 18, 2020

(51) Int. Cl.
*G05G 11/00* (2006.01)
*B25J 9/00* (2006.01)
*B25J 9/08* (2006.01)

(52) U.S. Cl.
CPC .......... *B25J 9/0072* (2013.01); *B25J 9/0045* (2013.01); *B25J 9/0009* (2013.01); *B25J 9/0033* (2013.01); *B25J 9/0069* (2013.01); *B25J 9/08* (2013.01)

(58) Field of Classification Search
CPC ...... B25J 18/005; B25J 9/0045; B25J 9/0072; B25J 9/0069; B25J 9/0009; B25J 9/0033;
(Continued)

(56) References Cited

U.S. PATENT DOCUMENTS

| 2013/0053866 A1* | 2/2013 | Leung | ............ A61B 34/30 |
| | | | 606/130 |
| 2014/0096636 A1* | 4/2014 | Hirano | ............ F16C 29/0633 |
| | | | 74/490.01 |

FOREIGN PATENT DOCUMENTS

| CN | 103639712 A | 3/2014 |
| CN | 104325456 A | 2/2015 |

(Continued)

OTHER PUBLICATIONS

International Search Report issued in corresponding International application No. PCT/CN2017/078533, dated Nov. 29, 2017.

*Primary Examiner* — Jake Cook

(57) ABSTRACT

Disclosed is a three-branched six-degree-of-freedom parallel mechanism with curved sliding pairs, which includes a base, a moving platform, and three identical kinetic branches. The kinetic branches are radially and evenly distributed and arranged between the base and the moving platform. Each kinetic branch includes a first curved link assembly, a first motor, and a support link. One end of the support link is hinged to the moving platform. One end of the first curved link assembly is hinged to the support link. The first motor is disposed on the base and is configured for driving the first curved link assembly to rotate, where an arc
(Continued)

length of the first curved link assembly is changed as the first curved link assembly is driven to rotate.

5 Claims, 2 Drawing Sheets

(58) Field of Classification Search
CPC ........ B25J 9/0051; B25J 9/08; B25J 17/0283; B25J 18/02; B25J 18/025
See application file for complete search history.

(56) References Cited

FOREIGN PATENT DOCUMENTS

| | | | |
|---|---|---|---|
| CN | 104827463 A | * | 8/2015 |
| CN | 104965590 A | | 10/2015 |
| CN | 106346450 A | | 1/2017 |
| CN | 106426091 A | | 2/2017 |
| CN | 106903673 A | | 6/2017 |
| JP | 2013543799 A | | 12/2013 |

* cited by examiner

PARALLEL MECHANISM WITH SIX DEGREES OF FREEDOM HAVING ARC-SHAPED PRISMATIC PAIRS IN THREE BRANCHES

TECHNICAL FIELD

This disclosure relates to the technical field of robot design and manufacture, and more particularly relates to a three-branched six-degree-of-freedom parallel mechanism with curved sliding pairs.

BACKGROUND

A parallel mechanism is typically formed by connecting a moving platform and a fixed platform through a plurality of branches. Since the parallel robot was first proposed in 1938 it has been widely used in various fields of the society by virtue of its large rigidity, strong bearing capacity, small error, high precision, small self-weight to load ratio, good dynamic performance, and ease of control. Nowadays, commonly seen are 2-degree-of-freedom (DOF), 3-degree-of-freedom, 4-degree-of-freedom, and 6-degree-of-freedom parallel mechanisms. An essential feature of a 6-degree-of-freedom parallel mechanism is that each branch has six independent degrees of freedom, or in other words each branch must be capable of generating a six-dimensional displacement group. Thus, based on the Stewart six-degree-of-freedom parallel mechanism, new six-degree-of-freedom parallel mechanism models can be obtained by changing the type, order and direction of arrangement of the kinetic pairs in the branches while maintaining the six independent deuces of freedom of the branches.

Representatives include a 3-PPSP six-degree-of-freedom parallel mechanism proposed by Byun et al. in 1997, the Linpaod configuration proposed by the University of Stuttgart of Germany, and a new three-branched six-degree-of-freedom robot (CN201310502815.5) proposed by GAO Feng et al. from Shanghai Jiaotong University, a three-branched six-degree-of-freedom parallel mechanism (CN201410700723.2) with a rope-driven joint proposed by LI Bin et al. from Tianjin University Of Technology, a six-degree-of-freedom three-branched parallel robot mechanism (CN201210227966.X) proposed by ZHANG Jianjun et al. from Hebei University of Technology, a three-branched six-degree-of-freedom robot drive mechanism (CN201410388991.5) proposed by WANG Yongfeng et al. from Hebei University of Technology.

Most of these mechanisms, however, have symmetrically arranged branches, and require many drives, resulting in a complicated control method, (for example, a 3-PPSP parallel mechanism has 9 drives); or they can only produce a relatively small number of forms of motion (multiple drives achieve less than 6 degrees of freedom of motion).

SUMMARY

One primary technical problem to be solved by the present disclosure is to provide a three-branched six-degree-of-freedom parallel mechanism with curved sliding pairs that has a relatively small number of drives and is easy to control.

In order to solve the above technical problem, a technical solution adopted by the present disclosure is to provide a three-branched six-degree-of-freedom parallel mechanism with curved sliding pairs, which includes a base, a moving platform, and three identical kinetic branches. The kinetic branches are radially and evenly distributed and arranged between the base and the moving platform. Each of the kinetic branches includes a first curved link assembly, a first motor and a support link. One end of the support link is hinged to the moving platform, and one end of the first curved link assembly is hinged to the support link. The first motor is disposed on the base for driving the first curved link assembly to rotate, where an arc length of the first curved link assembly is also changed as the first curved link assembly is rotating.

Each of the kinetic branches further includes a second curved link assembly and a second motor. One end of the first curved link assembly and one end of the second curved link assembly are hinged to different positions of the support link along a length of the support link. The second motor is disposed on the base for driving the second curved link assembly to rotate, where an arc length of the second curved link assembly is also changed as the second curved link assembly is rotating.

The first curved link assembly and the second curved link assembly each include an upper curved link, a lower curved link, and a universal hinge. The universal hinge connects an upper end of the curved link to the support link. A lower end of the upper curved link is nested with the upper end of the lower curved link. A lower end of the lower curved link is connected to an output shaft of the first motor or the second motor corresponding thereto.

The lower curved link includes a curved portion and a straight portion that are connected to each other. A lower end of the straight portion is connected to the output shaft of the first motor or the second motor corresponding thereto. The curved portion has an hollow tubular feature and the upper curved link is nested into the lower curved link.

Each of the kinetic branches further includes a first motor stand and a second motor stand disposed on the base. The first motor and the second motor are disposed on the first motor stand and the second motor stand, respectively.

The second curved link assembly is hinged to another end of the support link. The present disclosure provides the following beneficial effects. Compared with the related art, the three-branched six-degree-of-freedom parallel mechanism with curved sliding pairs provided by the present disclosure includes three identical kinetic branches which arc radially and evenly distributed and arranged between the base and the moving platform. Each of the kinetic branches includes a support link hinged to the moving platform. One end of the first curved link assembly is hinged to the support link. The first motor is disposed on the base for driving the first curved link assembly to rotate where an arc length of the first curved link assembly is also changed as the first curved link assembly is rotating. Therefore, the six-degree-of-freedom adjustment can be realized with a relatively small number of drives, resulting in a simple structure and providing ease of control and steady movement.

BRIEF DESCRIPTION OF THE ACCOMPANYING DRAWINGS

DETAILED DESCRIPTION OF ILLUSTRATIVE EMBODIMENTS

Figure 1:
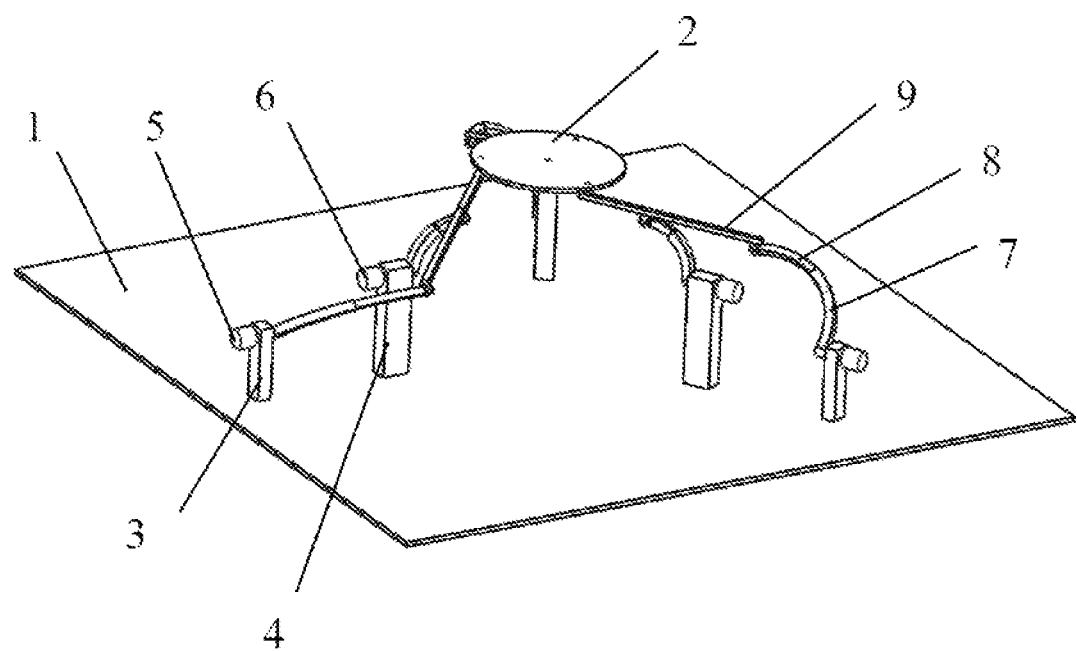
FIG. 1 is a perspective view of a three-branched six-degree-of-freedom parallel mechanism with curved sliding pairs in accordance with the present disclosure.
Figure 2:
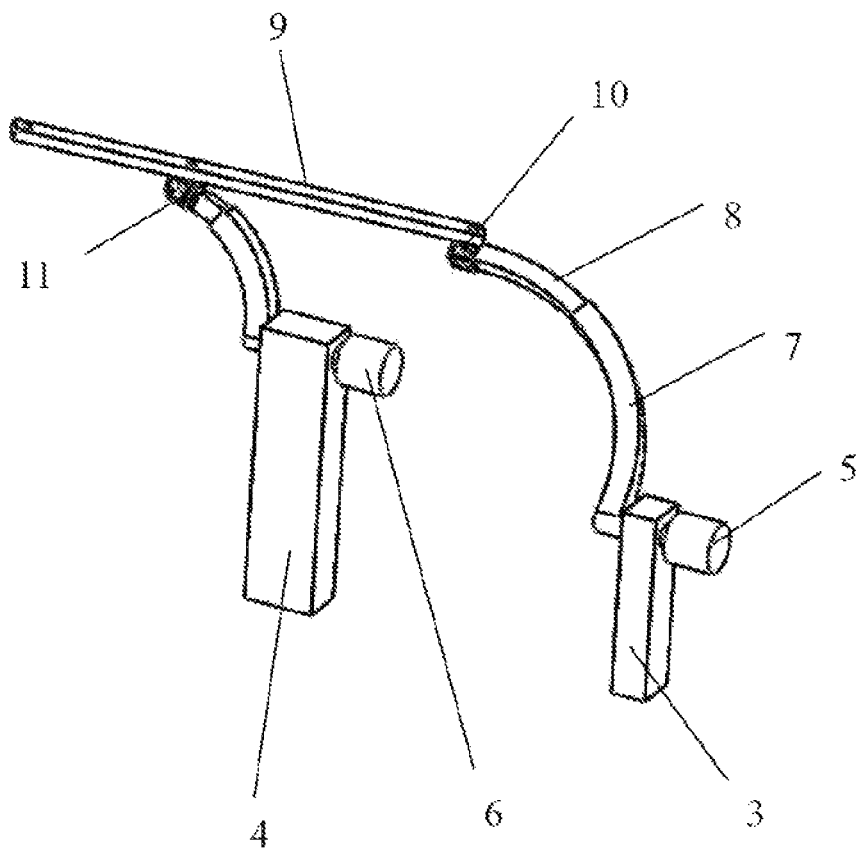
FIG. 2 is a schematic diagram illustrating a kinetic branch of the three-branched six-degree-of-freedom parallel mechanism shown in FIG. 1.
Figure 3:
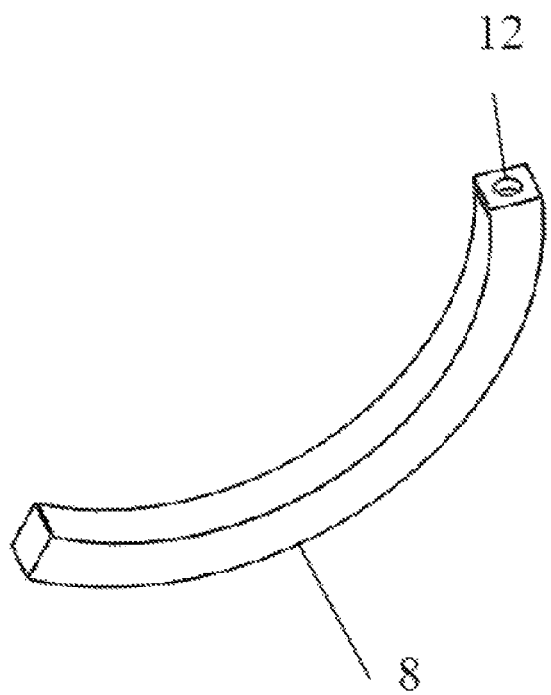
FIG. 3 is a schematic diagram illustrating an upper curved link of the kinetic branch shown in FIG. 2.
Figure 4:
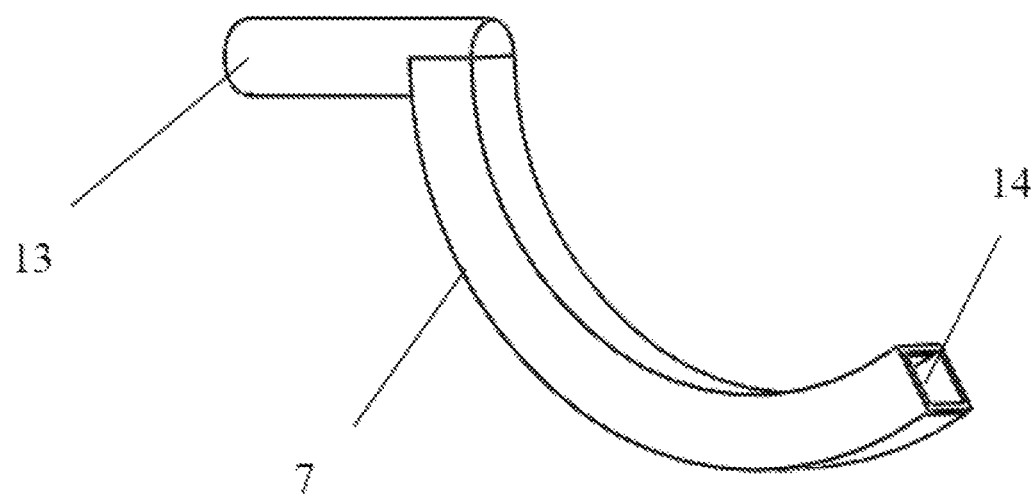
FIG. 4 is a schematic diagram illustrating a lower curved link of the kinetic branch shown in FIG. 2.

Referring to FIGS. 1 and 2, the three-branched six-degree-of-freedom parallel mechanism with curved sliding pairs according to the present disclosure includes a base 1, a moving platform 2, and three identical kinetic branches.

The kinetic branches are radially and evenly distributed and arranged between the base 1 and the moving platform 2. By even distribution, it means that the positions on the base 1 (fixing points) where the three kinetic branches are arranged lie on the same circle (base positioning circle) where lines that connect the fixing points of any two kinetic branches to the center of the base positioning circle form an angle of 120°, and the positions on the moving platform 2 (hinging points) where the three kinetic branches are arranged also lie on the same circle (moving platform positioning circle) where lines that connect the hinging points of any two kinetic branches to the center of the moving platform positioning circle form an angle of 120 degrees.

Each of the kinetic branches includes a first curved link assembly, a first motor 6, and a support link 9. One end of the support link 9 is connected to the moving platform 2 by a ball joint (the hinging position is namely the aforementioned hinging point). One end of the first curved link assembly is hinged to the support link 9. The first motor 6 is disposed on the base 1 (the position where the first motor is disposes is namely the aforementioned fixing point) for driving the first curved link assembly to rotate, where an arc length of the first curved link assembly is changed as the first curved link assembly is rotating.

The first curved link assembly has the same shape as a portion of a circular circumference of a circle, namely it has a circular arc shape. The length of the circular arc is simply referred to as the arc length, where this arc length may change as the first motor is driving the first curved link assembly to rotate; that is, the arc length ma become longer or shorter. By adopting the above-described parallel kinetic branches, the six-degree-of-freedom adjustment can be realized leading to a simple structure, ease of control, and steady movement.

To take into account the adjusting speed and positioning precision, each of the kinetic branches may further include a second curved link assembly and a second motor 5. One end of the first cursed link assembly and one end of the second curved link, assembly are hinged to different positions of the support link 9 along a length the support link 9. The second motor 5 is disposed on the base 1 for driving the second curved link assembly to rotate, where an arc length of the second curved link assembly is also changed as the second curved link assembly is rotating.

The support link 9 has a linear elongated shape. Typically, the second curved link assembly is hinged to the other end of the support link 9. The first curved link assembly is hinged to a middle section of the support link 9, where by "middle section" it means the remaining portion with a quarter of the entire length being removed from each end. Typically, the first curved link assembly is hinged to the midpoint of the support link 9.

By controlling the first motor 6 and the second motor 5 on each of the kinetic branches, the first curved link assembly and the second curved link assembly would be made to rotate around the output shafts of the first motor 6 and the second motor 5 respectively. As the first curved link assembly and the second curved link assembly are rotated, the arc lengths of the first curved link assembly and the second curved link assembly would also be changed, thereby driving the moving platform 2 to achieve a spatial motion of six degrees of freedom via the action of the support link 9.

For different application fields, the first motor 6 can be used as the main driving source to realize the rapid positioning of the moving platform, while the second motor 5 may serve as an auxiliary driving source to help the moving platform 2 realize the positional precision adjustment.

Specifically, the first curved link assembly and the second curved link assembly each include an upper curved link 8, a lower curved link 7, and a universal hinge 10 or 11.

The universal hinge 10 or 11 connects an upper end 12 of the curved link 8 to the support link 9. A lower end of the upper curved link 8 is nested with the upper end of the lower curved link 7 where the two meaning the upper curved link 8 and the lower curved link 7 share a same center of a circle. A lower end of the lower curved link 7 is connected to an output shaft of the first motor 6 or the second motor 5 corresponding thereto.

The lower curved link 7 includes a curved portion and a straight portion that are connected to each other. A lower end 13 of the straight portion is connected to the output shaft of the first motor 6 or the second motor 5 corresponding thereto. The curved portion has an hollow tubular feature 14 and the upper curved link 8 is nested into the lower curved link 7. In actual applications, a hollow tubular feature may also be provided on the upper curved link 2, while the curved portion of the lower curved link 7 may be nested into the upper curved link 2.

Alternatively, a curved chute may be provided in one of the upper curved link 2 and the lower curved link 7, while a curved slide or the like may be provided on the other. Both the fully covered hollow tubular feature and the partially covered curved chute and slide arrangement are included within the scope in which the curved link 2 and the lower curved link 7 are nested-connected in the present disclosure.

Further, each of the kinetic branches may include a first motor stand 4 and a second motor stand 3 disposed on the base. The first motor 6 and the second motor 5 are disposed on the first motor stand 4 and the second motor stand 3, respectively.

Compared with the related art, the three-branched six-degree-of-freedom parallel mechanism with curved sliding pairs provided by the present disclosure includes three identical kinetic branches which are radially and evenly distributed and arranged between the base 1 and the moving platform 2. Each of the kinetic branches includes a support link 9 hinged to the moving platform 2. One end of the first curved link assembly is lunged to the support link 9. The first motor 6 is disposed on the base 1 for driving the first curved link assembly to rotate where an arc length of the first curved link assembly is also changed as the first curved link assembly is rotating. Therefore, the six-degree-of-freedom adjustment can be realized with a relatively small number of drives, resulting in a simple structure and providing ease of control and steady movement. Further, each of the kinetic branches is provided with a second curved link assembly and a second motor that drives the second curved link assembly to rotate. The second curved link assembly and the first curved link assembly are hinged to different positions of the support link along a length of the support link. One of the motors is used as the main driving source to realize the rapid positioning of the moving platform, while the other motor is used as the auxiliary driving source to realize the positional precision adjustment of the moving platform, thereby balancing the adjusting speed and adjusting precision. Furthermore, the driving capability, robustness and carrying capacity of the three-branched six-degree-of-freedom parallel mechanism of the present disclosure can meet various application requirements in the fields such as machining tools, robot detection, and so on.

The foregoing merely describes some illustrative embodiments in line with the present disclosure, and are not intended to be limiting the patentable scope of the present disclosure. Therefore, any equivalent structural or flow changes made based on the specification and drawings of the present disclosure, or any direct or indirect application of the present disclosure in other related technical fields shall by the same token fall in the scope of protection of the present disclosure.

What is claimed is:

1. A three-branched six-degree-of-freedom parallel mechanism with curved sliding pairs, comprising a base, a moving platform, and three identical kinetic branches, wherein the kinetic branches are radially and evenly distributed and arranged between the base and the moving platform, wherein each of the kinetic branches comprises a first curved link assembly, a first motor, and a support link, wherein the support link comprises one end hinged to the moving platform, the first curved link assembly comprises one end hinged to the support link, and the first motor is disposed on the base and is configured for driving the first curved link assembly to rotate, wherein an arc length of the first curved link assembly is changed as the first curved link assembly is driven to rotate;

wherein each of the kinetic branches further comprises a second curved link assembly and a second motor, wherein one end of the first curved link assembly and one end of the second curved link assembly are hinged to different positions of the support link along a length of the support link, wherein the second motor is disposed on the base and is configured for driving the second curved link assembly to rotate, and where an arc length of the second curved link assembly is changed as the second curved link assembly is driven to rotate.

2. The three-branched six-degree-of-freedom parallel mechanism of claim 1, wherein the first curved link assembly and the second curved link assembly each comprise an upper curved link, a lower curved link, and a universal hinge, wherein the universal hinge connects an upper end of the upper curved link to the support link, a lower end of the upper curved link is nested-connected to an upper end of the lower curved link, and a lower end of the lower curved link is connected to an output shaft of the corresponding first motor or second motor.

3. The three-branched six-degree-of-freedom parallel mechanism of claim 2, wherein the lower curved link comprises a curved portion and a straight portion that are connected to each other, wherein a lower end of the straight portion is connected to the output shaft of the corresponding first motor or second motor, the curved portion has a hollow tubular structure, and the upper curved link is nested into the lower curved link.

4. The three-branched six-degree-of-freedom parallel mechanism of claim 1, wherein each of the kinetic branches further comprises a first motor stand and a second motor stand that are disposed on the base, wherein the first motor and the second motor are disposed on the first motor stand and the second motor stand, respectively.

5. The three-branched six-degree-of-freedom parallel mechanism of claim 1, wherein the second curved link assembly is hinged to another end of the support link.

\* \* \* \* \*